United States Patent
Argiolas

(10) Patent No.: US 12,054,684 B2
(45) Date of Patent: Aug. 6, 2024

(54) APPARATUS FOR EROSION MONITORING BY MEANS OF OPTICAL FIBERS

(71) Applicant: REMOSA S.R.L, Cagliari (IT)

(72) Inventor: Cristian Argiolas, Cagliari (IT)

(73) Assignee: REMOSA S.R.L, Cagliari (IT)

( * ) Notice: Subject to any disclaimer, the term of this patent is extended or adjusted under 35 U.S.C. 154(b) by 291 days.

(21) Appl. No.: 17/640,985

(22) PCT Filed: Sep. 9, 2020

(86) PCT No.: PCT/IB2020/058357
§ 371 (c)(1),
(2) Date: Mar. 7, 2022

(87) PCT Pub. No.: WO2021/048747
PCT Pub. Date: Mar. 18, 2021

(65) Prior Publication Data
US 2022/0348835 A1   Nov. 3, 2022

(30) Foreign Application Priority Data
Sep. 9, 2019 (IT) .......................... 102019000015692

(51) Int. Cl.
*C10G 75/00* (2006.01)
*C10G 11/00* (2006.01)
(Continued)

(52) U.S. Cl.
CPC .............. *C10G 75/00* (2013.01); *C10G 11/00* (2013.01); *G01C 19/56* (2013.01);
(Continued)

(58) Field of Classification Search
CPC .... C10G 75/00; C10G 11/00; G01D 5/35374; G01P 15/093; G01P 15/18; G01V 1/181; G01H 9/004; G01C 19/56
(Continued)

(56) References Cited

U.S. PATENT DOCUMENTS 4,336,415 A * 6/1982 Walling ................ E21B 17/206
138/125
4,446,892 A * 5/1984 Maxwell ............... G01M 3/045
138/104
(Continued)

FOREIGN PATENT DOCUMENTS

FR   2809810 A1 * 12/2001 ............. G01K 11/32
JP   3410101 B2 * 12/1999 ............. B29C 35/02
(Continued)

OTHER PUBLICATIONS

Corning Inc., Corning SMF-28 Optical Fiber, 2002, 4 pg(s) (Year: 2002).*
(Continued)

*Primary Examiner* — Stephanie E Bloss
*Assistant Examiner* — Kevin C Butler
(74) *Attorney, Agent, or Firm* — R. Ruschena Patent Agent, LLC

(57) ABSTRACT

Apparatus for monitoring the erosion of components of industrial plants comprising at least one optical fiber sensor (7'), the optical fibers (7') not being provided with any Bragg grid, and an analysis unit, wherein the at least one optical fiber sensor (7') is positioned inside a wall subjected to wear by erosion in such a way as to terminate immediately under the surface of the wall itself belonging to the components (10, 10', 20, 20') to be monitored, and the erosion depth is measured by using the light reflected from the eroded end of the optical fiber (7') itself.

14 Claims, 10 Drawing Sheets

(51) Int. Cl.
  *G01C 19/56* (2012.01)
  *G01D 5/353* (2006.01)
  *G01H 9/00* (2006.01)
  *G01P 15/093* (2006.01)
  *G01P 15/18* (2013.01)
  *G01V 1/18* (2006.01)
(52) U.S. Cl.
  CPC ......... *G01D 5/35374* (2013.01); *G01H 9/004* (2013.01); *G01P 15/093* (2013.01); *G01P 15/18* (2013.01); *G01V 1/181* (2013.01)
(58) Field of Classification Search
  USPC ...................................................... 73/514.26
  See application file for complete search history.

(56) References Cited

U.S. PATENT DOCUMENTS

| | | | | |
|---|---|---|---|---|
| 4,849,668 | A * | 7/1989 | Crawley | H10N 30/00 310/317 |
| 4,859,024 | A * | 8/1989 | Rahman | G02B 6/4439 385/112 |
| 5,209,136 | A * | 5/1993 | Williams | H02G 1/08 74/502 |
| 6,004,639 | A * | 12/1999 | Quigley | F16L 11/081 428/36.3 |
| 7,399,446 | B2 * | 7/2008 | Herzog | G01K 11/32 422/50 |
| 7,515,781 | B2 * | 4/2009 | Chimenti | G01N 17/04 385/12 |
| 9,354,183 | B2 * | 5/2016 | Chimenti | G01N 21/94 |
| 2005/0239910 | A1 * | 10/2005 | Jarosch | B01J 19/0093 518/726 |
| 2007/0019898 | A1 * | 1/2007 | Chimenti | G01L 1/246 385/12 |
| 2020/0033893 | A1 * | 1/2020 | Krishnamurthy | G05D 7/0676 |

FOREIGN PATENT DOCUMENTS

| | | | | |
|---|---|---|---|---|
| WO | WO-9617223 | A1 * | 6/1996 | ......... B29C 35/0288 |
| WO | WO-2013165959 | A1 * | 11/2013 | ............. C10B 55/00 |
| WO | WO-2019077467 | A1 * | 4/2019 | ............ B01J 8/0055 |

OTHER PUBLICATIONS

Durak et al., Precise Optical Fiber Length Measurement System Based on Fresnel Reflection, Journal of Eletrical Engineering 4 (2016) pp. 128-132 (Year: 2016).*

Hennig et al, Latest Generation of Ili tools for High Resolution Ultrasonic Inspection and Integrity Assessment, Proceedings of the ASME 2015 India Oil and Gas Pipeline Conference IOGPC2015, New Delhi, India, Apr. 17-18, 2015, pp. 5 (Year: 2015).*

* cited by examiner

APPARATUS FOR EROSION MONITORING BY MEANS OF OPTICAL FIBERS

BACKGROUND OF THE INVENTION

1. Field of the Invention

Object of the present invention is an innovative erosion monitoring system of components subject to wear. In particular, the present invention is suitable for plants equipped with a fluidized catalyst, in particular catalytic cracking plants provided with a fluid bed, in English Fluid Catalytic Cracking (FCC), i.e. plants for the conversion of oil fractions into finished products. These plants carry out a process through which light paraffinic hydrocarbons (for example gasoline, GPL) are obtained by breaking the heavy paraffinic hydrocarbon molecules and the distillation residues of crude oil. In particular, the object of the present invention is to monitor the erosion of walls coated in refractory and/or anti-erosion material of such components. The present invention is also suitable for any other application in which there are components subject to wear or erosion or subject to both corrosion and erosion, for example in a piping system ("piping"), which connects either the various equipment of a plant (for example a hydraulic, chemical or petrochemical plant) or, more generally, any industrial plant or component of a machine subjected to the listed phenomena.

2. Brief Description of the Prior Art

With regard, purely by way of example, to FCC plants as known, the catalytic cracking fluidized bed is one of the most important conversion processes used in oil refineries. It is widely used to convert the high boiling and high molecular weight fraction of hydrocarbon crude oils into products of higher economic value such as gasoline, olefin gases and other similar products. Cracking of petroleum hydrocarbons, originally made as thermal cracking, has now been almost completely replaced by catalytic cracking, as it produces a greater gasoline amount with a larger octane number. Catalytic cracking also makes it possible to obtain, as a by-product, gaseous elements with a higher olefin content, which are also more important than those produced by thermal cracking.

Generally, the charge of a catalytic cracking plant consists in the portion of crude oil that has an initial boiling point of 340° C. or higher, at atmospheric pressure, and an average molecular weight between about 200 and 600 or higher. The catalytic cracking process vaporizes and breaks the long-chain molecules of high-boiling liquid hydrocarbons into much shorter molecules at high temperature and moderate pressure, by means of a fluidized powder catalyst.

It is clear that all FCC plants, as well as all plants using a fluidized catalyst, have at their inside parts subject to erosion, in which erosion cannot be diagnosed by its thermal effects on the external walls. In fact, in all these plants the walls subject to erosion are coated with an anti erosion material supported by a metal grid, on which the anti-erosion coating is solidly anchored. The inability to monitor the erosion by means of its thermal effects may be due to the fact that the walls subject to erosion, such as the walls of the cyclones, are not bounded with the outer environment. It may also be due to the fact that the thickness of the materials subject to erosion or their particular conformation, for example with orifices or plugs, or in general the interiors of valves, causes that the extent of erosion to be monitored has negligible effect on the temperature of the boundary walls with the particular environment. In particular, this happens in valves operated with a fluid that contains the catalyst in which the consequences caused by erosion of the interior of said valves occur much earlier than before the erosion has thermal consequences which are detectable from the outside of the valves themselves.

The Applicant, with the international patent application WO2019077467 (A1), has already identified a suitable solution, by means a system for monitoring the erosion of components subject to wear for use in fluidized bed catalytic cracking plants comprises a bundle of fiber optic sensors with a Bragg grid and a processing unit. This is a very sophisticated and accurate method but at the same time it is demanding from an economic point of view: the sensors need the Bragg grid to be inscribed on the optical fibers and the processing unit must be a Bragg grid analyzer or an amplifier for a photocell, with a circulator that interrogates the optical fibers present one at a time.

The Applicant has more recently filed an international patent application WO2020/049448A1, identifying a system and a method to allow the entry of optical fibers from outside the FCC plant. This international patent application is understood to be incorporated herein by reference in its entirety.

Therefore, there is a need to define an innovative system to monitor the erosion of the walls of components subject to erosion in FCC plants, which is not based on the variation of temperature and which therefore does not use the Bragg grid, and which therefore has a lower economic impact.

SUMMARY OF THE INVENTION

The purpose of the present invention is therefore to monitor the progression of erosion in a structure subject to particular wear by the passage of fluids, through the use of optical fibers capable of withstanding the high temperatures (up to 900° C.) typical of FCC plants, integrated inside and near the walls to be monitored, whose light signal is collected by a suitable light signal analyzer.

The object of the present invention is therefore an innovative apparatus for monitoring the erosion of FCC plants components, of piping systems or other industrial plants or machine components, the apparatus comprising a plurality of optical fibers (not provided with a Bragg grid) and a unit for analyzing and processing the light reflected by the optical fibers. The optical fibers may simply be those used for telecommunications, such as the Corning SMF-28, without the need for any optical modification to the same.

The optical fibers are installed in such a way as to terminate immediately under the surface of the wall the erosion of which is to be monitored, according to a first aspect of the invention in which the fibers are positioned orthogonally to the wall, in such a way as to shorten by the same extent as the wall itself erodes. The depth of the erosion is then measured as the shortening of the optical fiber itself calculated on the basis of the light reflected from the termination surface of the eroded optical fiber, of the time between the emission of a light pulse from the emitting source and the time required to receive the impulse reflected from the termination of the optical fiber, or from the time that elapses between the reflection coming from a reflecting discontinuity of the optical fiber located at a known distance and the reflection coming from the eroded termination of the optical fiber, or from the variation of the spectrum created from the interference between the light reflected from the eroded optical fiber termination and a reflective discontinuity of the optical fiber located at a known distance. The reference discontinuities may be constituted for example either by an imperfect welding of the optical fiber or from a localized index variation of the refractive index in the optical fiber core, induced by an ultra-short laser pulse called femto-second laser.

According to a further aspect of the invention, optical fibers are installed in a parallel manner along the surfaces to be monitored at a constant depth. A spectrum analyzer with two ports, one for light output (sender) and the other for light input (receiver) connected to the two ends of the optical fiber, sends a light signal along the optical fiber and collects it on the other end. The continuity of the light signal demonstrates that erosion has not yet reached the erosion limit threshold, whereas when the light signal is interrupted it indicates that the erosion limit threshold has been reached or exceeded. As an alternative to the spectrum analyzer, a fiber optic photocell could also be used.

Advantageously, the plurality of optical fiber sensors reaches the wall subjected to wear by erosion, passing through suitable cavities of supporting structures for anti-erosion coatings of the wall itself. After the subsequent application and drying of the anti-erosion coating, the erosion sensors will be perfectly integrated in the same.

Therefore, the object of the present invention is an apparatus for erosion monitoring comprising at least one optical fiber sensor, the optical fibers not being provided with a Bragg grid, and an analysis unit, as specified in the independent claim.

The dependent claims outline particular and further advantageous aspects of the invention.

BRIEF DESCRIPTION OF THE DRAWINGS

These and other advantages of the invention will now be described in detail, with reference to the accompanying drawings, which represent an exemplary embodiment of the invention, in which.

DETAILED DESCRIPTION OF THE INVENTION

In this detailed description, reference will be made, purely by way of example, to the application of the apparatus for monitoring erosion in FCC plants. In the following we will also mention the same application in piping systems ("piping"), in order to show the possible application of the apparatus in any type of industrial plant, where there is at least one component subject to erosion.

Figure 1:
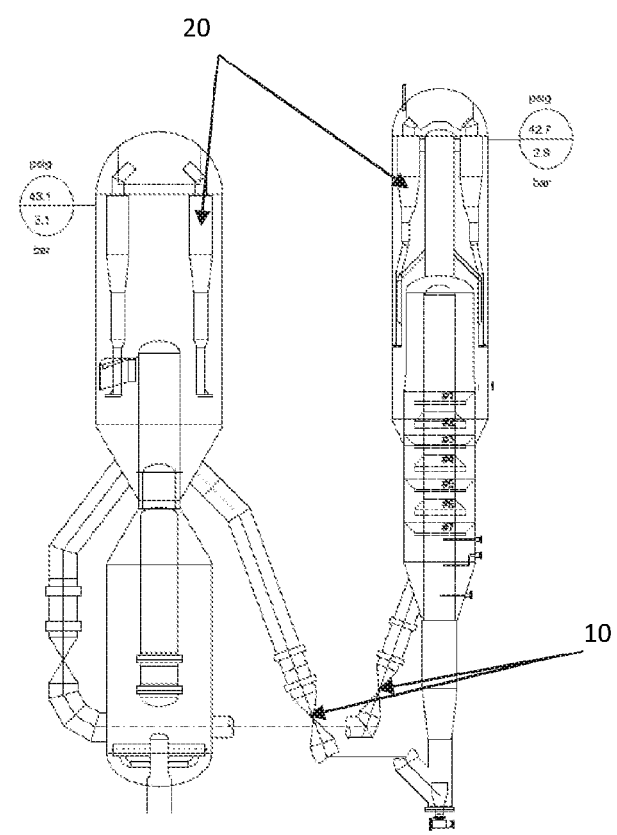
FIG. 1 shows a portion of a general diagram of the FCC plant.

With reference to FIG. 1, there is shown a portion of a general diagram in a FCC plant of a known type, in which, by way of example, some components subject to erosion such as valves 10 and cyclones 20 are shown. Still by way of example, other components, not shown in the figures, subjected to erosive phenomena are the air diffuser to the regenerator or the injection nozzles of the reactor charge.

For these types of plants, the valves used are generally modulation valves with quick emergency closing function to block the system, sometimes (typically for Exxon process only) the two modulation and block functions are separated into two distinct valves placed in series. These valves are typically called FCC slide valves.

Figure 2:
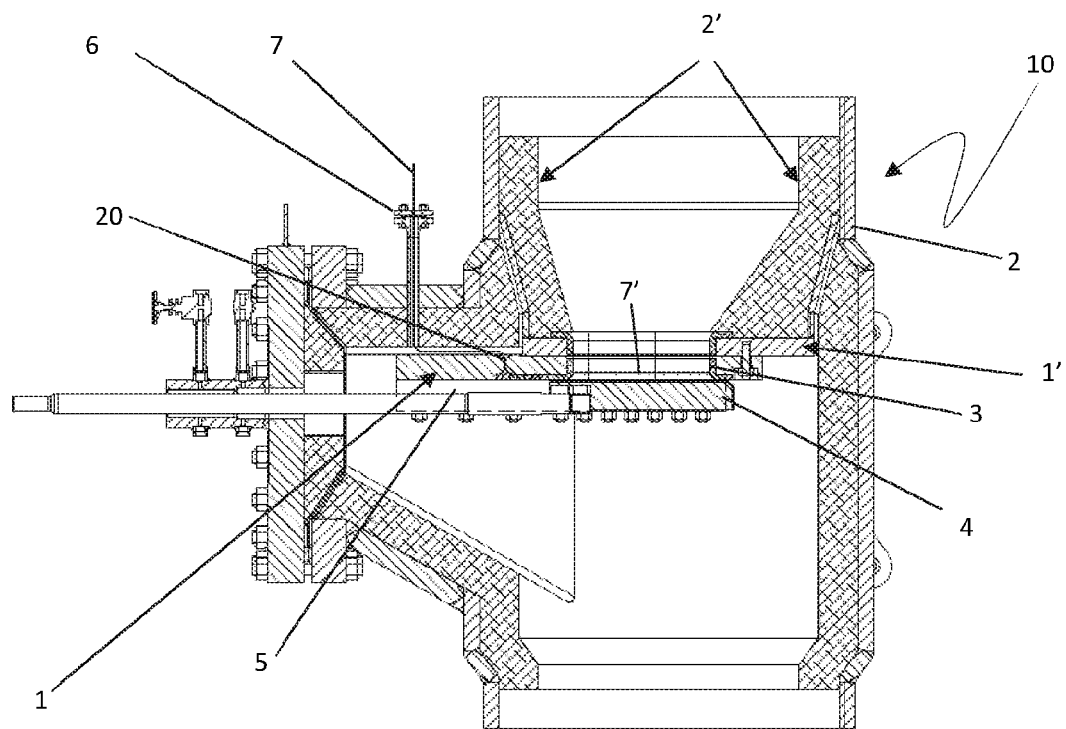
FIG. 2 shows a cross-section of a valve of the plant of FIG. 1, to which it is applied according to a first aspect of the invention, as a first embodiment of the present invention.

The body of the valve 10 has a refractory coating 2' and the shutter disc 4 is formed in one piece, coated on its entire upper and front surfaces and for over 50% of its lower surface with abrasion resistant material. Both surfaces of the removable perforated plate 1, located in correspondence with the shutter 4, and the surfaces of the perforated support plate 1', located above the plate 1, are exposed to flows and therefore are coated with erosion-resistant material usually supported by metal radial brackets 11. Such brackets 11 are evenly spaced and thereto firmly anchored in the anti-erosion coating that fills entirely the space between the brackets 11. In particular, as shown in FIG. 2, the valve 10 comprises along the walls 2 a refractory material 2' and at the level of the removable perforated plate 1, an anti-erosion coating 3. The same anti-erosion coating is also present in a mirrored way on the perforated support plate 1' to which the removable perforated plate 1 is fixed by means of tie rods. Finally, the sides and the lower portion of the shutter in contact with the sliding guides 5 are hardened with a cobalt-based coating.

Figure 3:
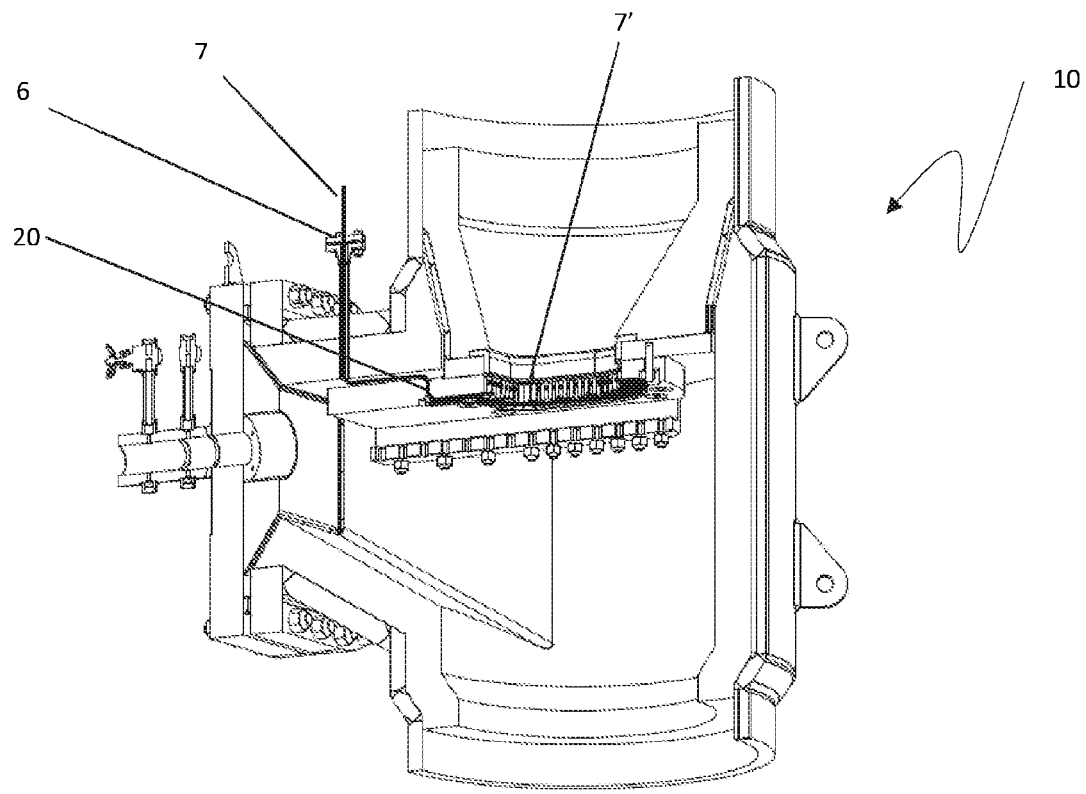
FIG. 3 shows a cross-sectional perspective view of the valve in FIG. 2.
Figure 4:
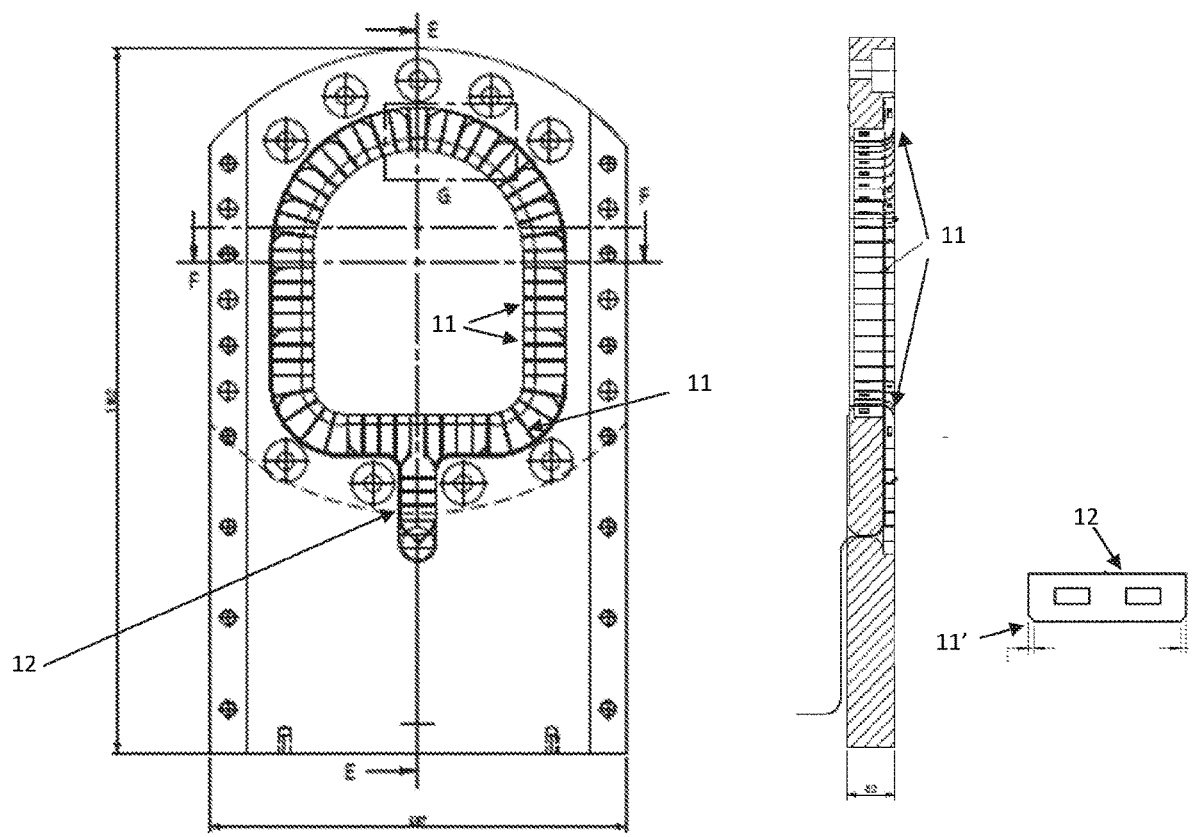
FIG. 4 shows, in a sectional view and in some details, the removable perforated plate of the valve in FIG. 2.
Figure 4:
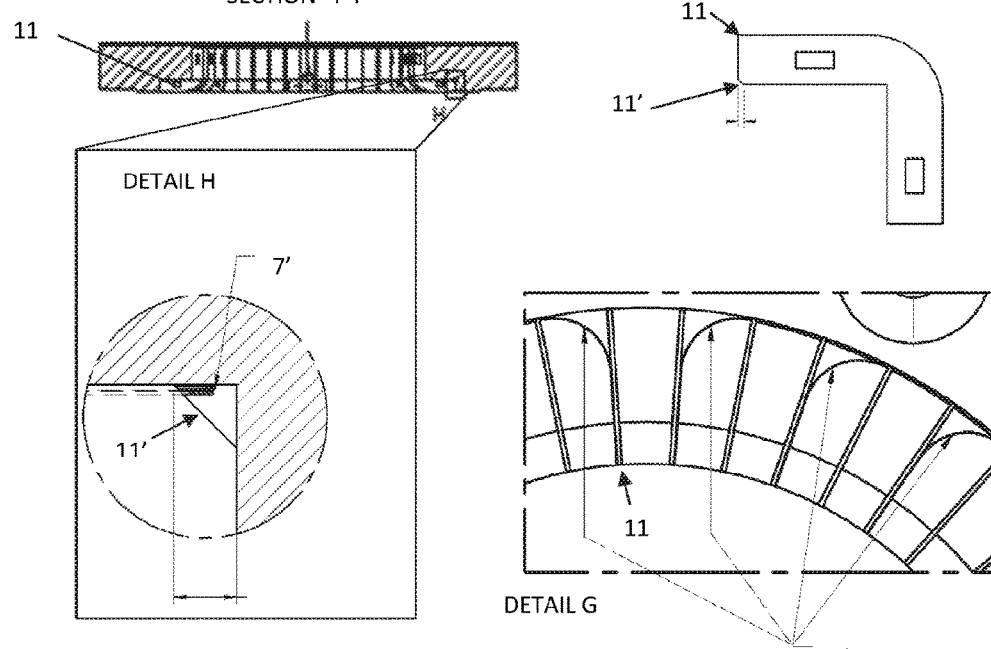

According to a first aspect, in a first absolutely not limiting embodiment of the present invention a bundle 7 of optical fiber sensors 7' is present, wherein the optical fibers 7' are not provided with any Bragg grid, and is inserted inside an inlet duct 6 which in FIGS. 2 and 3 is transverse to the shutter 4 of the valve 10, but which could have a more suitable inclination in order to maximize the radius of curvature of the optical fibers. The bundle 7 of fiber optic sensors 7' reaches the surface of the removable perforated plate 1, facing the shutter 4, through an opening 20 of the removable perforated plate 1 itself. The opening 20 can be more suitably shaped and inclined to maximize the radius of curvature of the optical fibers and to obtain together with the inlet duct 6 a path as linear as possible for the optical fibers. After passing through the opening 20, the fibers reach the mouth of the removable plate 1, as shown in FIG. 4, passing through a suitable groove alternated with plates 12, provided with suitable chamfers 11' for the passage of the optical fibers. The groove is lined with anti-erosion material, supported by the plates themselves.

Figure 5:
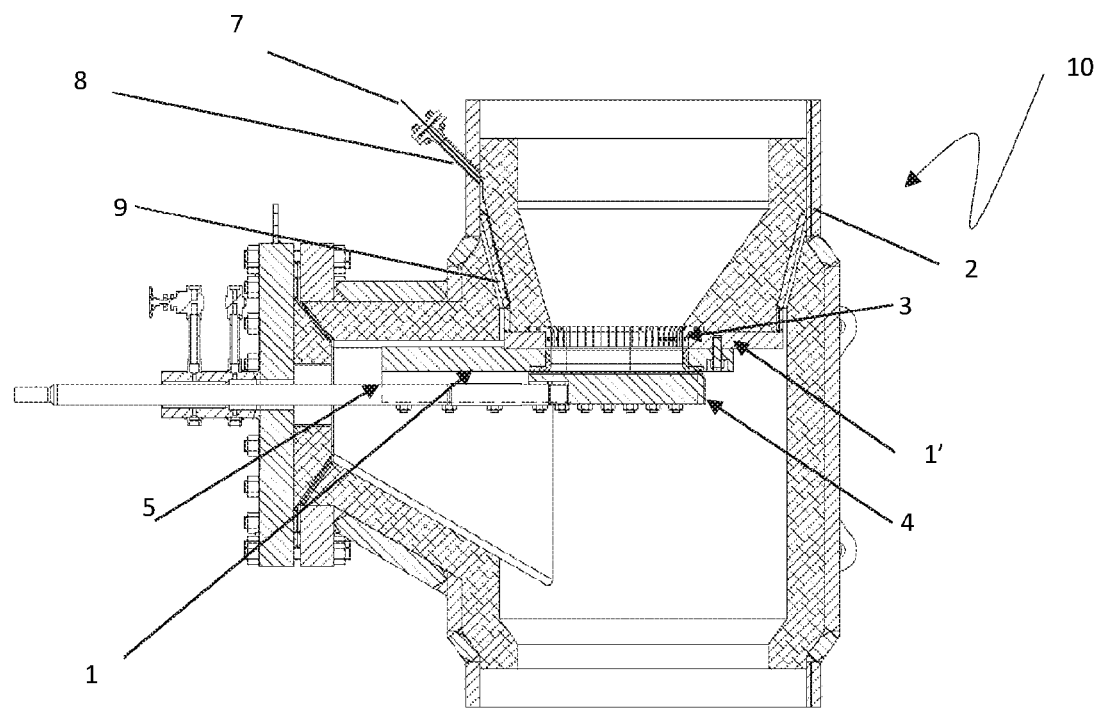
FIG. 5 shows a cross-section of a valve of a plant of FIG. 1, to which a second embodiment of the present invention is applied.
Figure 6:
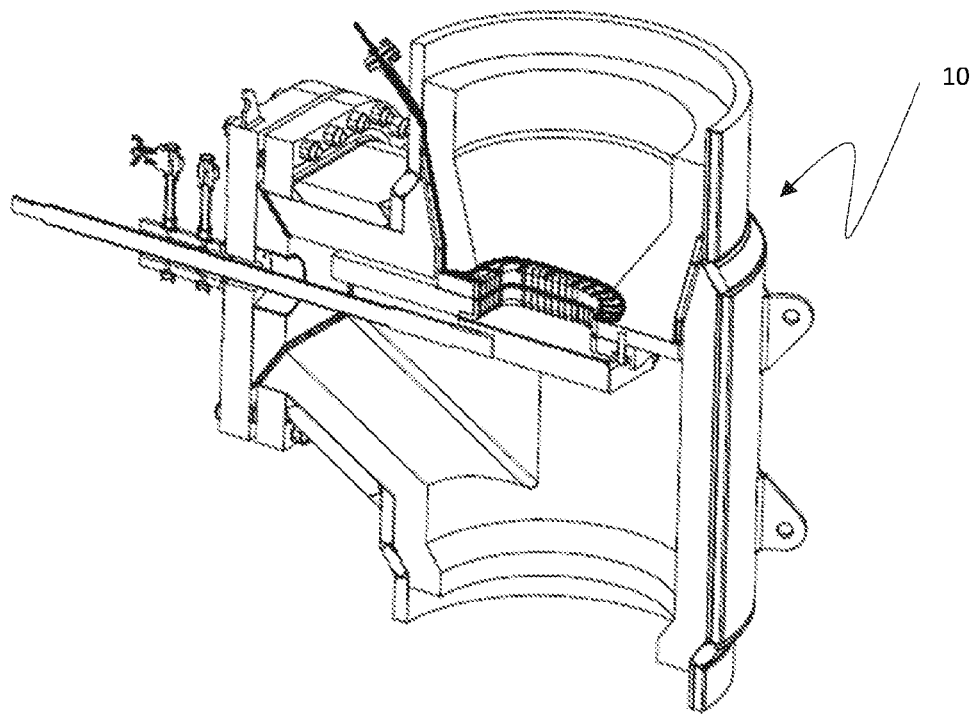
FIG. 6 shows a perspective cross-section of the valve in FIG. 5.

According to a further also not limiting embodiment of the present invention, the bundle of sensors 7 with optical fibers 7' is inserted within an inlet duct 8 transverse to the wall 2 of the valve body 10 (FIGS. 5 and 6). The bundle of sensors 7 with optical fibers 7' reaches a support plate 1' of the removable perforated plate 1. The bundle 7 reaches the support plate 1' through a groove 9 of the valve itself.

The two embodiments can be alternative or complementary. It is therefore possible that erosion is monitored on the same valve 10 both at the level of the removable perforated plate 1 and at the level of the support plate 1'.

In both embodiments, the bundle of optical fibers 7 will run around the removable perforated plate 1 and/or the support plate 1' and the individual optical fibers 7' are inserted, as shown in detail G of FIG. 4 on the removable perforated plate 1 and on the support plate 1', following the arrangement of the particular brackets 11 arranged along the perimeter of the passage area of the perforated plates 1, 1' to which they are welded. To allow the optical fibers 7' pass through the brackets 11, in order to arrange themselves along the entire perimeter of the fluid passage area, the brackets 11 must have a special chamfer 11' dedicated to the passage of the fibers 7'. This chamfer 11' is not present in the brackets normally present on the market for supporting the anti erosion means. Once the bundle of sensors 7 with optical fibers 7' as well as the single optical fiber 7' are positioned correctly adhering to the walls of the brackets 11, the removable perforated plate 1 and/or the support plate covered by the erosion-resistant coating 3, supported by the brackets 11, fill the space between them.

Figure 7:
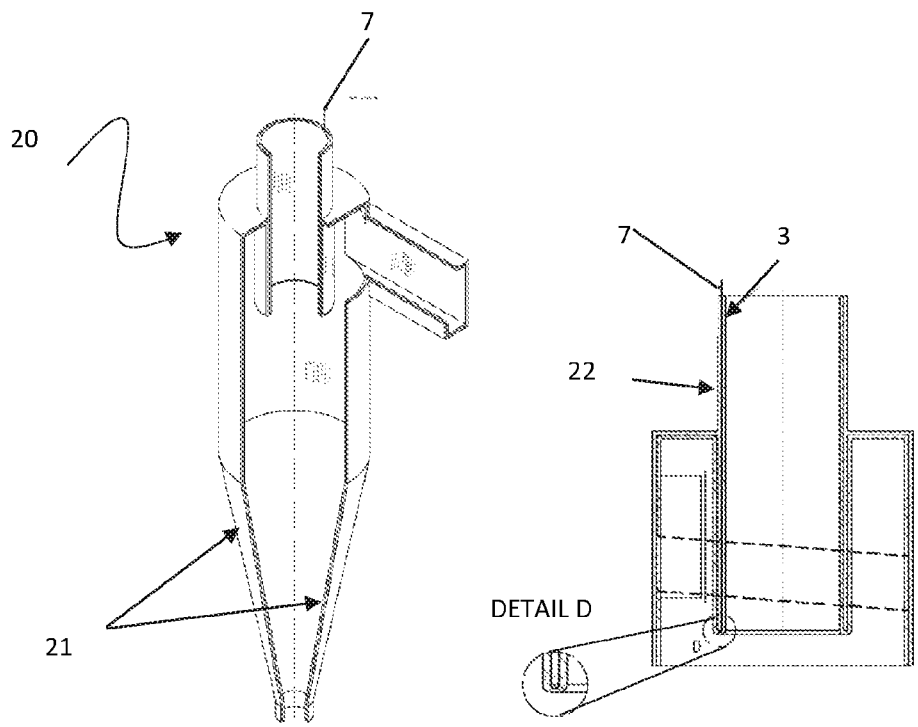
FIG. 7 shows a cross-section and two sections of a cyclone of the plant in FIG. 1, to which a third embodiment of the present invention is applied.
Figure 7:
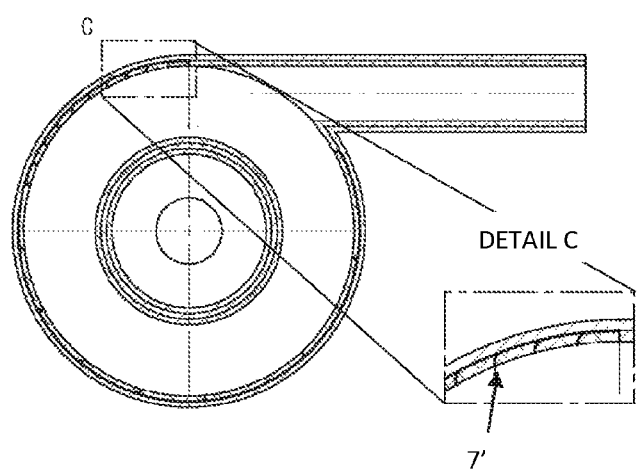
Figure 8:
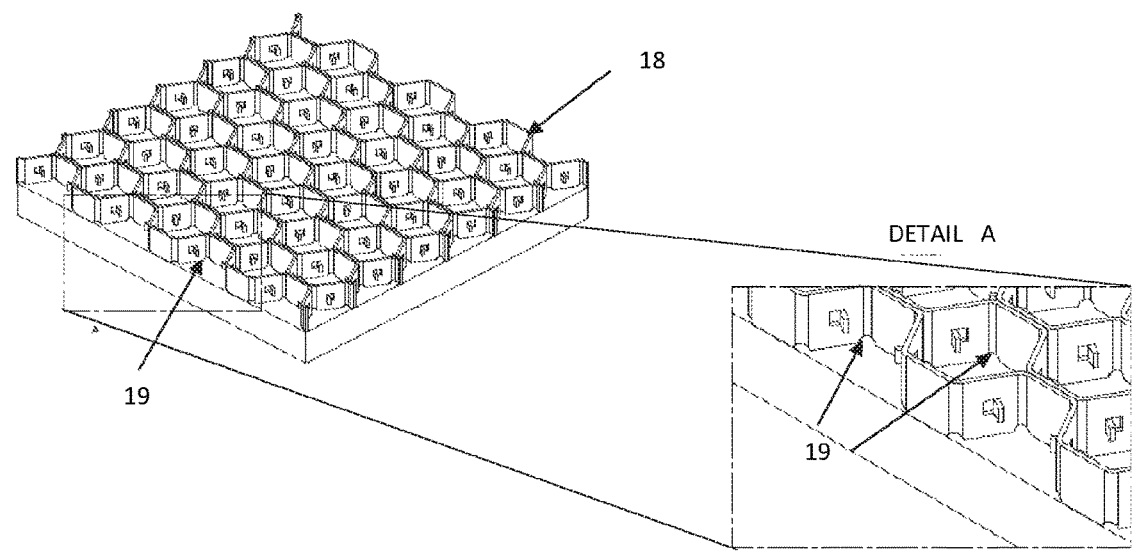
FIG. 8 shows a detail of the anti-erosion coating with a hexagonal mesh.
Figure 8:
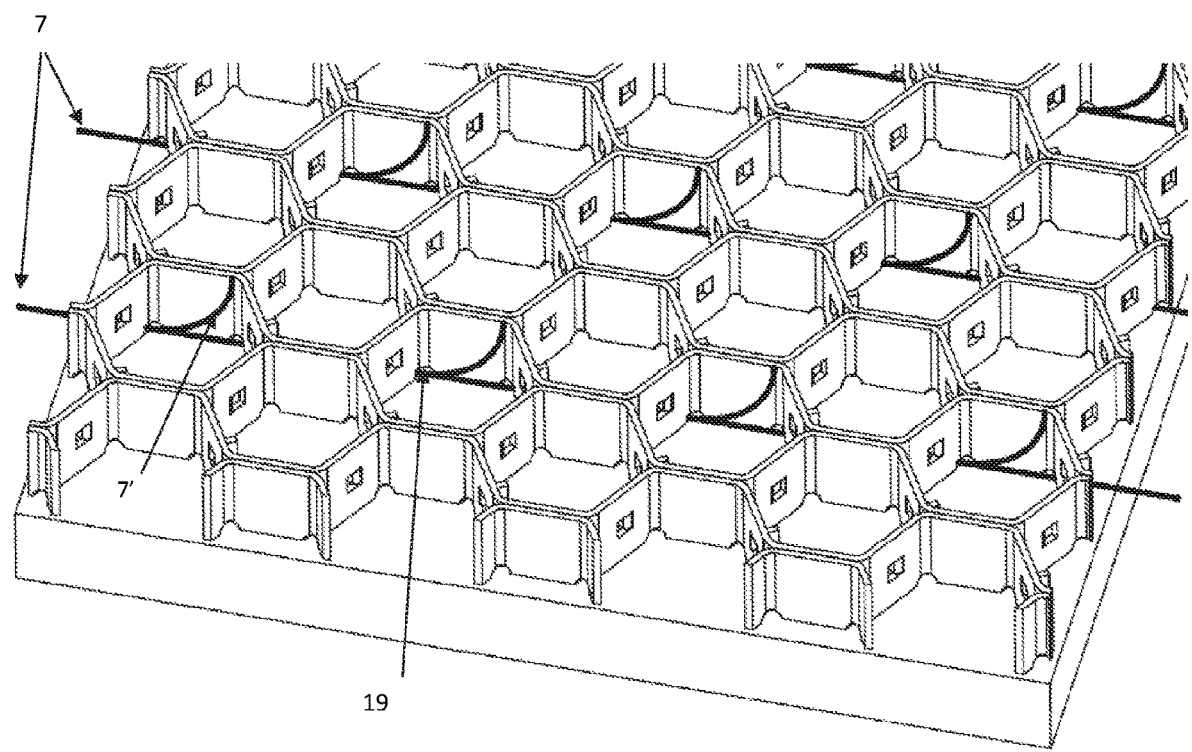

As shown in FIG. 7, the monitoring erosion system object of the present invention is also applied to the cyclones 20 of a FCC plant. In such cyclones 20, the bundle of sensors 7 with optical fibers 7' is made pass through the entire length of the walls 21 between the external coating 22 and the internal anti-erosion coating 3. The detail of section B-B shows how the individual optical fibers 7' are evenly spaced within the anti-erosion coating 3, wherein the support structure with hexagonal links 18 (FIG. 8) has elongated holes 19 for the passage of the same optical fibers 7', the elongated holes being normally not present in the hexagonal links for anchoring the anti-erosion material. What has been said above is also applicable to the surfaces of other components such as the air distributor of the regenerator and nozzles for the injection of the charge to the reactor, and in general to any surface protected by anti-erosion coatings. The above is also applicable to other variants of the supports for the anti-abrasive material, and it is also true that the optical fibers will run at the base of these supports adhering to the surface to which the supports are fixed, which is typically welded, and then emerge orthogonally to the surface to be monitored orthogonally to it. Preferably the supports for the anti-abrasive material must be provided with suitable grooves, to allow the optical fibers to be blocked at their fixing base and to position them correctly before the application and drying of the anti-abrasive and/or refractory material.

Figure 9:
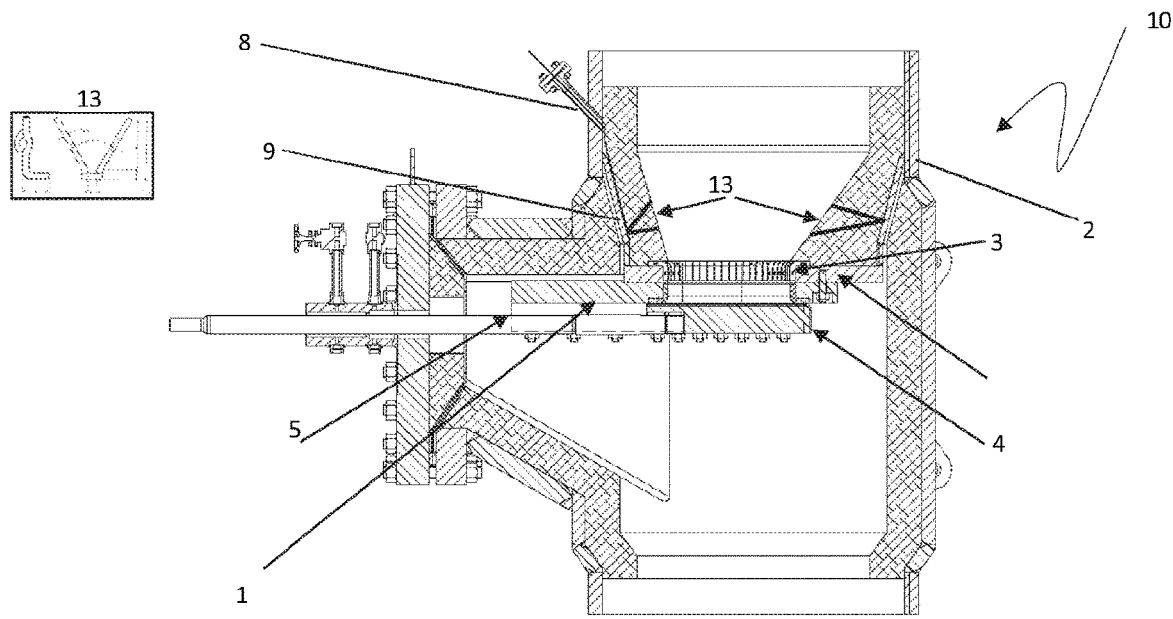
FIG. 9 shows a section of the valve in FIG. 5 and FIG. 6, to which a further embodiment of the invention is applied.
Figure 10:
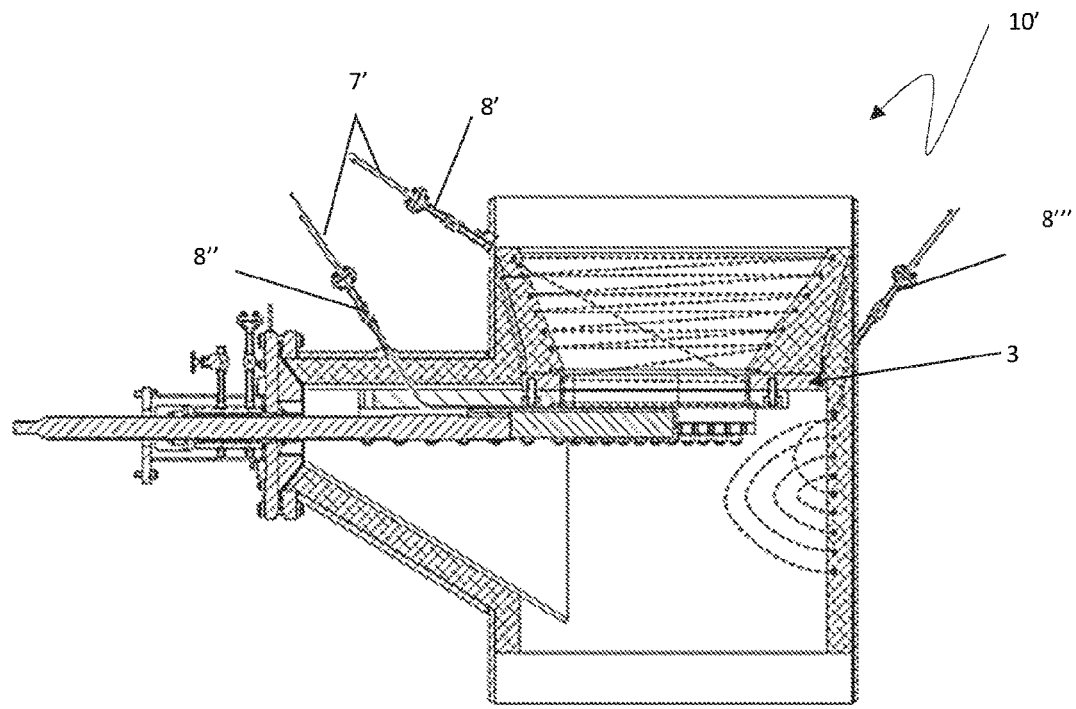
FIG. 10 shows a cross-section of a valve of the plant of FIG. 1, according to a further aspect of the present invention.

In FIG. 9 a further embodiment of the monitoring system described by FIGS. 5 and 6 is shown, by means of which and thanks to the optical fibers 1 arranged along the anchoring profiles, typically "V-shaped", which are always present to support the refractory 2', it is possible to monitor the erosion also in the conical portion of the valve body 10 lined with refractory 2'. Due to the fact that the refractory is normally deposited by casting, in this particular area it will be necessary for the optical fibers to be intubated on suitably anchored capillaries in order to avoid breaking or displacement of the optical fibers 7' during casting.

In all configurations of the system in question, the particular path chosen for the optical fibers allows that, in areas where they are embedded in the anti-erosion means, or in the refractory material, the optical fibers 7' are always adherent to at least one metal surface or walls or a pipe. This guarantees a greater mechanical protection, both during the application of the anti-erosion means 3 and the refractory 2', and during operation. The use of steel alloy capillary tubes into which the optical fibers and/or optical fiber bundles are to be slid, even where these are adherent to a metal surface, can still be considered to obtain a further mechanical protection in addition to the one offered by the walls.

Due to the high temperatures involved, typically of 760° C., being they able to reach up to 900° C., in anomalous conditions, the optical fibers must be specifically designed for these temperatures, i.e. they must be coated or protected.

In order to mechanically protect the optical fiber and to make it immune to the thermal expansion of the materials through the optical fiber passes, the optical fiber must be installed inside particularly thin capillary tubes, for example inside a hypodermic tube Gage size 24RW ID 0.31 mm OD 0.56 mm. The optical fiber must also be bounded to such tube exclusively in a small portion near the terminal part in the immediate vicinity of the area where erosion is to be monitored, whereas all other parts of the optical fiber must be free to slide inside the capillary itself. In order to achieve this bond between the fiber and the capillary, an alumina-based ceramic glue such as AREMCO CERAMABOND 618-N-VFG, for example, can be used.

According to a further aspect of the present invention, as shown in FIGS. 10-13, the optical fibers are installed in parallel along the surfaces of the components of FCC plants, which are subject to erosion such as valves 10' and cyclones 20' to be monitored. As shown in the annexed Figures, in particular in FIG. 10, the cross-section of a valve 10' of a FCC plant is shown. Through at least one inlet duct 8', 8'', 8''' transversal to the shutter 4 of the valve 10'. A single fiber optic sensor 7' is made to enter and run parallel through the wall of the valve 10' and then to exit from the same inlet duct 8', 8'', 8''' from which it is made to enter. Similarly, in FIG. 11 the placement of an optical fiber sensor 7' is shown, up to a level of the removable perforated plate 1. The single optical fiber sensor 7' is inserted, as shown in detail M, on the removable perforated plate 1 and on the support plate 1' following the arrangement of the brackets 11, through a slot 11'.

Figure 11:
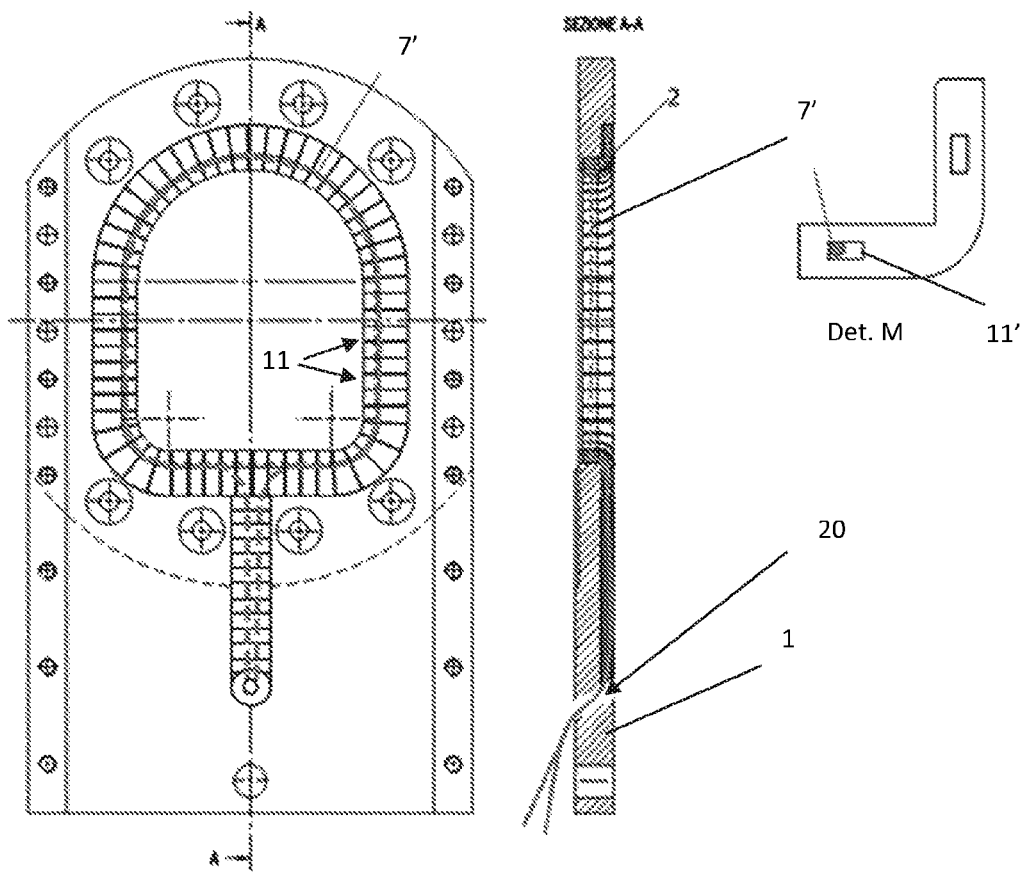
FIG. 11 shows, in a sectional view the removable perforated plate of the valve of FIG. 10.

At the level of the cyclone 20', as shown in FIG. 11, the optical fiber sensor 7' is inserted through an input duct 80 and is moved in parallel through the entire length of the walls 21 of the cyclone 20' itself.

Figure 12:
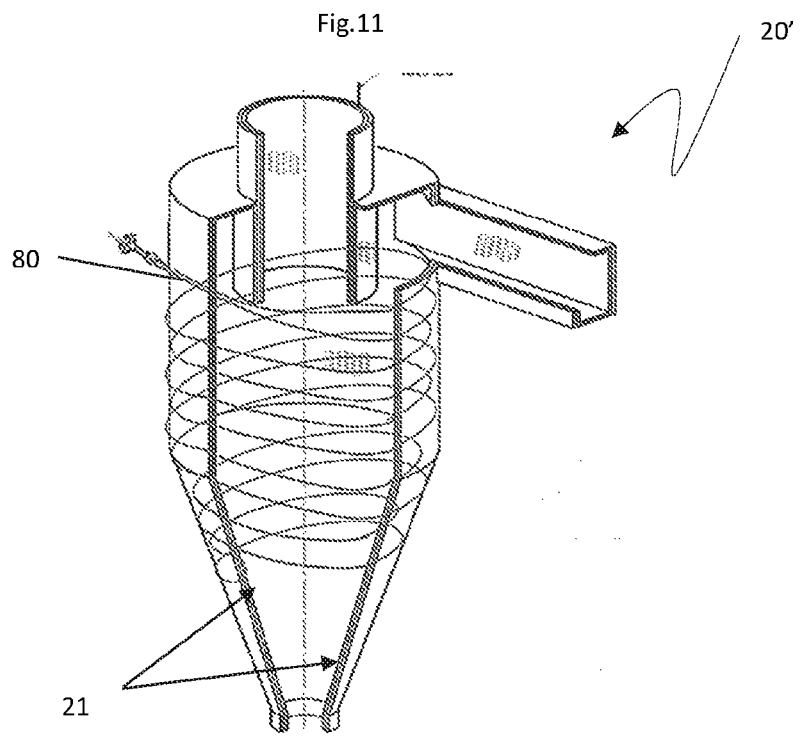
FIG. 12 shows a cross-section of the cyclone of the plant of FIG. 1, according to a different embodiment of a further aspect of the present invention.
Figure 13:
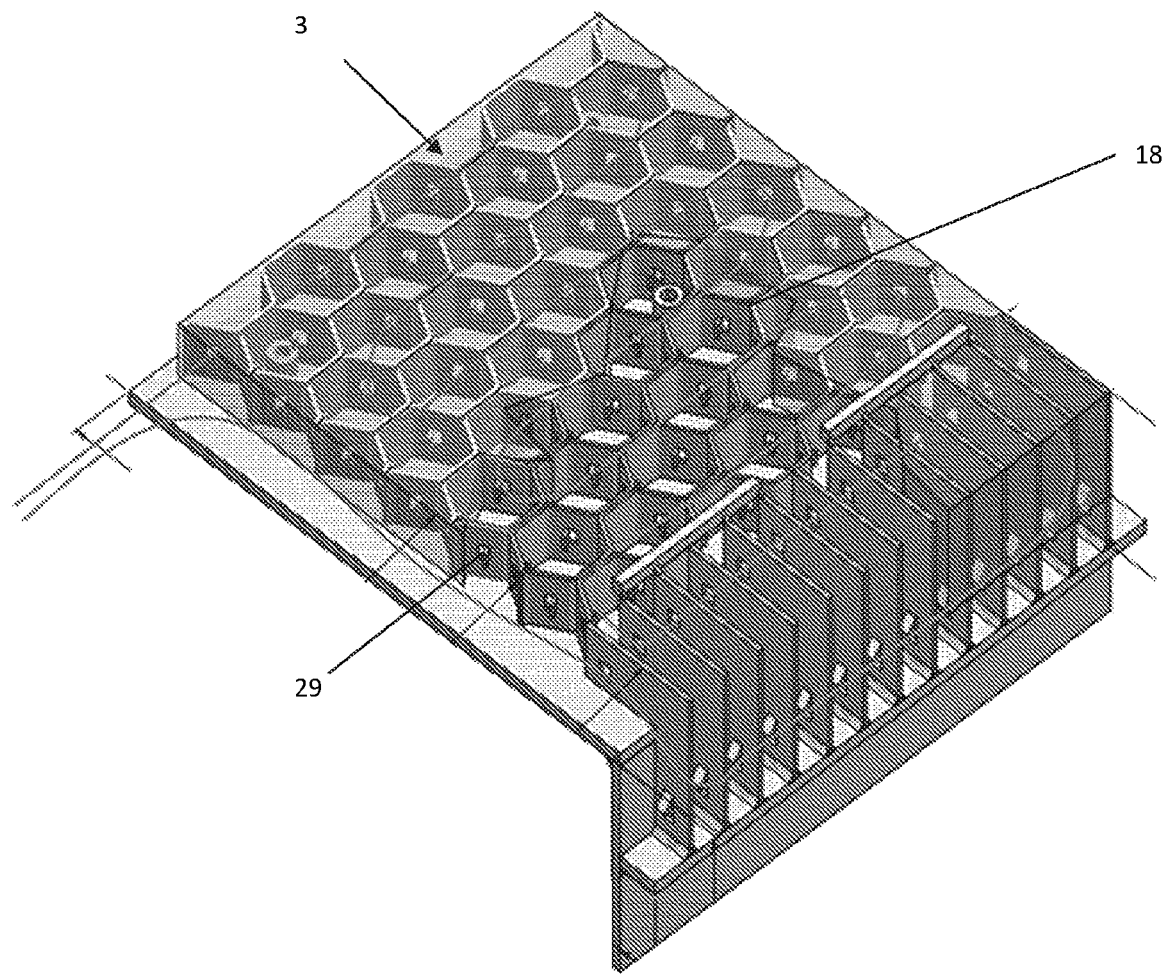
FIG. 13 shows a detail of the hexagonal mesh of the anti-erosion coating, where there are hex-mesh and corner tabs, which are typical supports coating almost the entire surface of all FCC plants, including cyclones.

Advantageously, according to said further aspect of the present invention, the optical fiber sensor 7', as shown in the detail of FIG. 12, is placed in parallel with a constant depth within the anti erosion coating 3. This depth is maintained by a hexagonal mesh support structure 18 having the holes 29, in a position corresponding to half the height of the hexagonal mesh 18 itself, in which the optical fiber sensor 7' is made or passed through. In this way the optical fiber sensor 7' is exactly embedded at half height with respect to the total height of the anti-erosion coating 3. An analyzer connected to the input and output of the optical fiber 7' sends a light signal along the optical fiber and collects it from the other end. The continuity of the signal demonstrates that erosion has not yet reached the erosion limit threshold, whereas when the signal no longer arrives it indicates that the erosion limit threshold has been reached or exceeded.

A further application of the apparatus for erosion monitoring according to the present invention is that regarding piping systems or "pipelines", according to the known English term.

Figure 14:
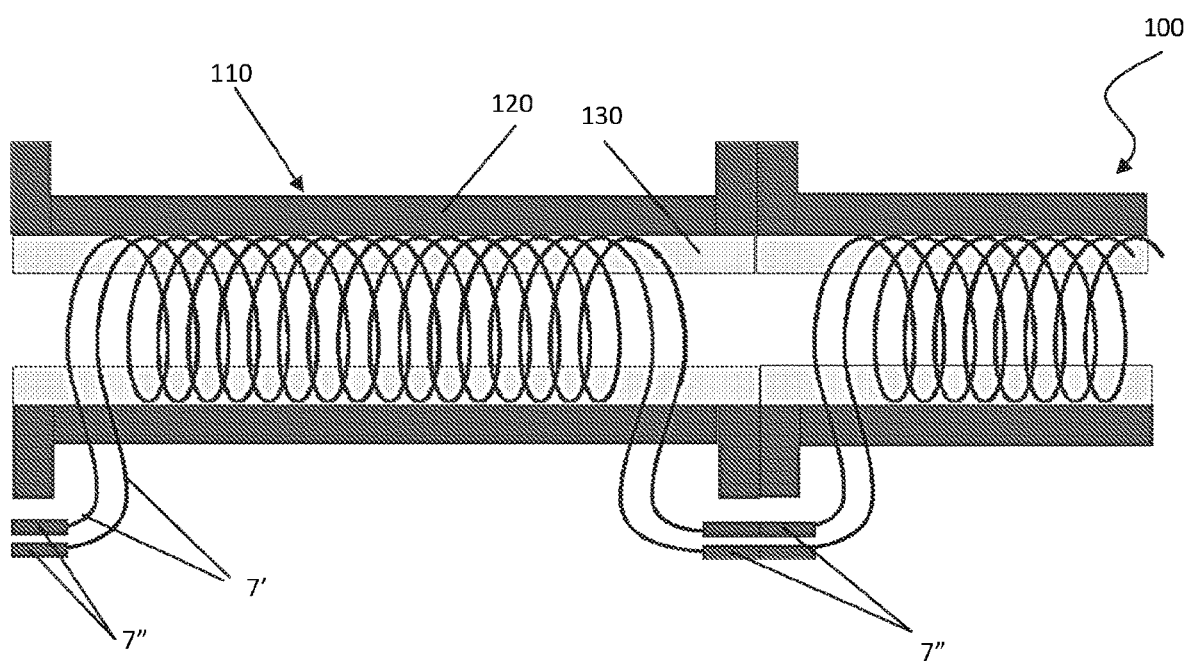
FIG. 14 shows in a schematic view the application of the erosion monitoring apparatus, by means of probes embedded parallel to the surface to be monitored, to a long piping system ("pipeline"), formed by the union of pipes equipped with probes for monitoring the erosion, interconnected among them.

With reference to FIG. 14, this represents a pipe 110 of a "pipeline" 100 formed for example by an outermost steel layer 120, protected from the inside by one or more abrasion resistant layers 130, in which between two of the layers that constitute it, the optical fibers 7' are placed, together with the optical fibers of the preceding and following tubes by means of connectors 7", and it is evident that it is possible to monitor the pipeline systems ("pipelines") and to detect the distance where the eroded section is placed, by using the same principles already seen in the case of FCC plants: as an alternative, by measuring the length of the optical fiber prior to erosion or sending a light pulse and counting the reflections from connectors encountered along their path, it is possible to determine which of the pipes that make up the "pipeline" has eroded, thus allowing it to be replaced before the erosion attacks the outermost layer, thus preventing spills of polluting or dangerous products.

Advantageously, for all aspects of the present invention, an analyzer of the length of single or double port optical fibers, of the known type and therefore not shown in the Figures, is used for measuring the length of the optical fiber (for example of the OZ Optics type-OFLM-1000). This instrument is able to quickly, accurately and reliably measure the length of the optical fibers, for distances up to 500 m and if parallel optical fibers are used, it is also able to detect the interruption of the optical fiber, and to measure the length of the two flaps after the optical fiber is interrupted, thus allowing to measure the amplitude of the eroded area. Alternatively, if parallel optical fibers are used, optical fiber photocells such as sensors of the SICK WLL180T group can be used to detect the interruption of the light transmitted through the optical fiber.

Even if at least one exemplary embodiment has been presented in the summary and in the detailed description, it is to be understood that there are a large number of variants within the scope of the invention. Furthermore, it must be understood that one or more embodiments presented are only examples which are not intended to limit in any way the scope of protection of the invention or its application or its configurations. Rather, the summary and the detailed description provide the technician skilled in the art with a convenient guide for implementing at least one exemplary embodiment, it being clear that numerous variations can be made in the function and assembly of the elements described herein, without departing from the scope of protection of the invention as established by the attached claims and their technical-legal equivalents.

The invention claimed is:

1. An apparatus suitable for monitoring the erosion of components of industrial plants, the apparatus comprising:
    at least one optical fiber sensor (7'), the optical fibers (7') not being provided with any Bragg grid;
    an analysis unit, and
    at least a wall of components of industrial plants (10, 10', 20, 20'), the wall being exposed to wear by erosion;
said apparatus being characterized in that the at least one optical fiber sensor (7') is accommodated, in use, inside the wall in such a way that one end of the least one optical fiber sensor (7') is accommodated, in use, under an external surface of the wall, and the erosion depth is measured by the light reflected by the optical fiber sensor (7'); and wherein said optical fiber sensors (7') are arranged in a bundle (7); and wherein a component of industrial plant is a valve (10) and said bundle (7) of optical fiber sensors (7') is accommodated, in use, within an inlet duct (6) transverse to a shutter (4) of the valve (10) and one end of said bundle (7) of optical fiber sensors (7') is under a surface of a removable perforated plate (1) facing the shutter (4), by passing through an opening (20) of the removable perforated plate (1) itself.

2. The apparatus according to claim 1, wherein the at least one fiber optical sensor (7'), which is part of a bundle (7) of optical fiber sensors (7'), is accommodated in use, orthogonally with respect to the wall subjected to wear to be monitored and the depth of the wall erosion is determined by the variation of the length of the same bundle (7) of optical fiber sensors (7').

3. The apparatus according to claim 2, wherein said bundle (7) of optical fiber sensors (7') is accommodated, in use, through suitable cavities (11', 19) of support structures (11, 18) of the anti-erosion coating (3) of the wall itself.

4. The apparatus according to claim 2, wherein said sensor bundle (7) with optical fibers sensor (7') is accommodated, in use, inside an inlet duct (8) transversal with respect to a wall (2) of the valve body (10) and one end of said bundle (7) of optical fiber sensors (7') is under a support plate (1') of the removable perforated plate (1) of the valve (10).

5. The apparatus according to claim 2, wherein said component of industrial plant is a cyclone (20) or an air distributor of a regenerator or a charge injection nozzle of a reactor and the bundle (7) of optical fibers sensor (7') is accommodated, in use, through the entire length of the walls (21) of the cyclone (20) or of the distributor or of the nozzle itself, between an outer coating plate (22) and the inner anti-erosion coating (3).

6. The apparatus according to claim 5, wherein the optical fibers of the bundle (7) of optical fibers sensor (7') are uniformly spaced inside the anti-erosion coating (3) and a support structure with hexagonal meshes (18) has elongated holes (19) for the passage of the optical fibers sensor (7').

7. The apparatus according to the claim 1, wherein said removable perforated plate (1) and/or said support plate (1') are covered by the anti erosion coating (3) supported by metal brackets (11) to which the anti-erosion coating (3) is anchored, and wherein appropriate chamfers (11') are obtained on said brackets (11) to allow the passage of the optical fiber sensors (7').

8. The apparatus according to claim 1, wherein at least one optical fiber sensor (7') is accommodated, in use, parallel to the wall exposed to wear by erosion, at a known depth which constitutes the limit threshold to be monitored, and the exceeding of the limit threshold is determined by the interruption of the light transmitted by the optical fiber.

9. The apparatus according to claim 1, wherein the at least one optical fiber sensor (7') is accommodated, in use, inside cavities (29) of support structures (11, 18) of anti-erosion coatings (3) of the wall.

10. The apparatus according to claim 1, wherein the at least one optical fiber sensor (7') is accommodated, in use, inside at least one inlet duct (8', 8", 8"') transversally to the shutter (4) of a valve (10') and one end of said at least one optical fiber sensor (7') protrudes from said inlet duct (8', 8", 8"').

11. The apparatus according to claim 1, wherein a single optical fiber sensor (7') in a cyclone (20') or in an air distributor of a regenerator or in a charge injection nozzle of a reactor is accommodated, in use, inside of an inlet duct (80) parallel to the wall (21) and one end of said single optical fiber sensor (7') protrudes from the same inlet duct (80).

12. The apparatus according to claim 1, wherein said analysis unit of the length of the at least one optical fiber sensor (7') is a single or dual port optical fiber length analyzer.

13. The apparatus according to claim 1, wherein said analysis unit is an optical fiber photocell.

14. The apparatus according to claim 1, wherein the at least one optical fiber sensor (7') is one of a plurality of optical fiber sensors interconnecting each other by means of connectors (7"), by forming a chain which connects pipes (110) of a "pipeline" (100).

\* \* \* \* \*